United States Patent
Lombrozo et al.

(10) Patent No.: US 10,029,638 B1
(45) Date of Patent: Jul. 24, 2018

(54) SECONDARY IMPACT AIRBAG

(71) Applicant: Waymo LLC, Mountain View, CA (US)

(72) Inventors: Peter Craig Lombrozo, Santa Cruz, CA (US); Felix Jose Alvarez Rivera, Tarzana, CA (US); Daniel Lynn Larner, San Jose, CA (US); Atul Gupta, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 52 days.

(21) Appl. No.: 15/218,560

(22) Filed: Jul. 25, 2016

(51) Int. Cl.
*B60R 21/0134* (2006.01)
*B60R 21/231* (2011.01)

(52) U.S. Cl.
CPC ........ *B60R 21/0134* (2013.01); *B60R 21/231* (2013.01); *B60R 2021/23107* (2013.01)

(58) Field of Classification Search
CPC .............. B60R 21/0134; B60R 21/231; B60R 2021/23107
USPC ........................................................ 180/271
See application file for complete search history.

(56) References Cited

U.S. PATENT DOCUMENTS

| | | | | |
|---|---|---|---|---|
| 6,419,262 B1 * | 7/2002 | Fendt | ................... | B60R 21/231 280/729 |
| 7,048,086 B2 | 5/2006 | Yoneda | | |
| 7,954,587 B2 | 6/2011 | Kisanuki et al. | | |
| 8,087,690 B2 * | 1/2012 | Kim | ................... | B60R 21/214 280/729 |
| 9,340,178 B1 * | 5/2016 | Khaykin | ................ | B60R 21/34 |
| 9,738,243 B2 * | 8/2017 | Fukawatase | .......... | B60R 21/233 |
| 2004/0262893 A1 * | 12/2004 | Kempf | ................... | B60R 21/34 280/730.1 |
| 2016/0264093 A1 * | 9/2016 | Suemune | ................ | B60R 21/36 |
| 2016/0264094 A1 * | 9/2016 | Suemune | ................ | B60R 21/36 |

FOREIGN PATENT DOCUMENTS

| | | | | |
|---|---|---|---|---|
| CN | 104709221 A | 6/2015 | | |
| DE | 3013022 A1 | 10/1981 | | |
| DE | 10121630 A1 | 11/2002 | | |
| DE | 10213178 A1 * | 2/2003 | ............ | B60R 21/36 |
| JP | 10217903 A | 8/1998 | | |
| JP | 2004066936 A | 3/2004 | | |
| JP | 2007216933 A * | 8/2007 | ............ | B60R 21/01 |
| JP | 2016107647 A | 6/2016 | | |

* cited by examiner

*Primary Examiner* — Faye M Fleming
(74) *Attorney, Agent, or Firm* — Lerner, David, Littenberg, Krumholz & Mentlik, LLP (57) ABSTRACT

Aspects of the disclosure relate to airbag systems for vehicles. The airbag systems may reduce the secondary impact forces felt by an object upon rebounding from an initial impact with an external airbag by encasing or substantially surrounding the pedestrian with the external airbag. The airbag system may include an initial impact airbag and a secondary impact airbag, wherein the secondary impact airbag is configured to reduce injury caused by a secondary impact of an object upon after an initial impact of the object with the initial impact airbag. The initial impact airbag may be configured to be deployed at a location where the object is predicted to collide with the vehicle. The secondary impact airbag may comprise one or more arms configured to surround the object upon the initial impact.

20 Claims, 10 Drawing Sheets

SECONDARY IMPACT AIRBAG

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pick up or destination location, and the vehicle maneuvers itself to that location.

An important component of an autonomous vehicle is the perception system, which allows the vehicle to perceive and interpret its surroundings using cameras, radar, sensors, and other similar devices. Data from the perception system is then used by the autonomous vehicle's computer to make numerous decisions while the autonomous vehicle is in motion, such as decided when to speed up, slow down, stop, turn, etc. These decisions are used to maneuver between locations but also to interact with and avoid collisions with other objects along the way.

When a collision actually occurs, non-autonomous and autonomous vehicles alike may include various safety mechanisms to reduce injury to passengers. Typically, the safety mechanisms may include airbag systems employed to protect passengers from impacts with the interior of a vehicle after an object external to a vehicle has impacted a bumper of the vehicle.

BRIEF SUMMARY

Embodiments within the disclosure relate generally to a system including an initial impact airbag and a secondary impact airbag. The secondary impact airbag may include one or more enclosing structures configured to surround an object, wherein the secondary impact airbag may be configured to reduce injury caused by a secondary impact of an object upon after an initial impact of the object with the initial impact airbag.

In some embodiments, the initial impact airbag is configured to be deployed at a location where the object is predicted to collide.

In some embodiments, the secondary impact airbag comprises one or more arms configured to surround the object upon the initial impact.

In some embodiments, one or more muscle wires are embedded within the one or more arms and the one or more muscle wires are configured, upon the occurrence of the initial impact, to guide the one or more arms around the object up on the initial impact.

In some embodiments, the system further comprises a power supply, wherein the power supply is configured to provide a current to the one or more muscle wires upon the occurrence of the initial impact.

In some embodiments, one or more extenders are connected to the one or more arms and the one or more extenders are connected to a first arm of the one or more arms and the one or more extenders are configured, upon the occurrence of the initial impact, to extend to a second arm of the one or more arms.

In some embodiments, the one or more extenders are telescoping tubes and wherein the telescoping tubes are each comprised of at least two stages.

In some embodiments, the system further comprises one or more sensors configured to determine when an initial impact occurs and the one or more sensors are configured to send a triggering signal to deploy the secondary impact airbag based upon the determination of when the initial impact occurs.

In some embodiments, the system further includes an airbag system comprising at least the initial impact airbag and secondary impact airbag and a vehicle, wherein the airbag system is attached to the vehicle.

Another aspect includes a method for deploying a vehicle's external airbag including determining, by one or more processors, a collision with an object is imminent, predicting, by the one or more processors, the location on the vehicle where the collision with the object is expected to occur, determining a first external airbag of one or more external airbags at the location on the vehicle where the collision is expected to occur, sending, by the one or more processors, a triggering signal to deploy the first external airbag, and in response to receiving the triggering signal, deploying by one or more processors, the first external airbag, wherein the first external airbag comprises an initial impact airbag and a secondary impact airbag and the secondary impact airbag is configured to reduce injury caused by a secondary impact of an object after an initial impact of the object with the initial impact airbag.

In some embodiments, the initial impact airbag is configured to be deployed at a location where the object is predicted to collide with the vehicle.

In some embodiments, the secondary impact airbag comprises one or more arms configured to surround the object upon the initial impact.

In some embodiments, one or more muscle wires are embedded within the one or more arms and the one or more muscle wires are configured, upon the occurrence of the initial impact, to guide the one or more arms around the object up on the initial impact.

In some embodiments, the triggering signal further causes a power supply to provide a current to the one or more muscle wires upon the occurrence of the initial impact.

In some embodiments, one or more extenders are connected to the one or more arms and the one or more extenders are connected to a first arm of the one or more arms and the one or more extenders are configured, upon the occurrence of the initial impact, to extend to a second arm of the one or more arms.

In some embodiments, the one or more extenders are telescoping tubes and wherein the telescoping tubes are each comprised of at least two stages.

In some embodiments, one or more sensors are configured to determine when an initial impact occurs; and the one or more sensors send a triggering signal to deploy the secondary impact airbag based upon the determination of when the initial impact occurs.

Another aspect includes a non-transitory computer readable medium on which instructions are stored, the instructions, when executed by one or more processors, cause the one or more processors to perform a method of deploying an external airbag. The method may include determining a collision with an object is imminent, predicting the location on the vehicle where the collision with the object is expected to occur, determining a first external airbag of one or more external airbags at the location on the vehicle where the collision is expected to occur, sending a triggering signal to deploy the first external airbag, and in response to receiving the triggering signal, deploying the first external airbag, wherein the first external airbag comprises an initial impact airbag and a secondary impact airbag and the secondary impact airbag is configured to reduce injury caused by a secondary impact of an object after an initial impact of the object with the initial impact airbag.

In some embodiments, the method further comprises deploying the initial impact airbag at a location where the object is predicted to collide with the vehicle.

In some embodiments, one or more muscle wires are embedded within the one or more arms and the one or more muscle wires are configured, upon the occurrence of the initial impact, to guide the one or more arms around the object up on the initial impact.

DETAILED DESCRIPTION

Overview

This technology relates to airbags which reduce the potential of secondary impact injuries to pedestrians or other objects impacted by a vehicle. For example, computing devices within a vehicle may determine that an impact with an object, such as a pedestrian, cannot be avoided by way of braking, steering, and/or accelerating the vehicle. When this is the case, the computing devices may release an external airbag to absorb the initial impact of the pedestrian and stop the pedestrian from making direct contact with the vehicle. However, after the initial impact, the pedestrian may be ejected from the external airbag in an opposite direction due to rebound energy from the collision. As such, the pedestrian is susceptible to secondary impact injuries, as the pedestrian may hit the ground or another object after being ejected. The secondary impact forces felt by the pedestrian may be minimized by encasing or substantially surrounding the pedestrian with the external airbag. By doing so, the secondary impact forces felt by the pedestrian as the pedestrian rebounds from the initial impact may be reduced, thereby limiting the severity of injuries.

External airbags may be mounted to a vehicle internally or externally. In this regard, the external airbag may be stored in a compartment, which may be mounted anywhere on or within the vehicle.

The external airbags may be designed to deploy and expand upon the vehicle detecting an imminent impact. In this regard, the vehicle's computing device may determine that an impact with a pedestrian is imminent and send a signal to deploy the external airbag. In response to the signal, the external airbag may then be inflated or filled to an expanded state.

In some embodiments the external airbags may be comprised of multiple sections. For instance, the external airbag may include an initial impact section and the secondary impact section may be comprised of one or more arms or other such enclosing structures. In some embodiments the one or more arms may include one or more extenders.

The initial impact section of the external airbag may be configured to absorb the initial impact forces. In this regard, the initial impact section may be configured to cover the portion of the vehicle which the pedestrian is projected to impact, such as the hood and/or windshield of the vehicle.

The secondary impact section may be configured to wrap around the object during or before the initial impact. For example, the secondary impact section may surround the pedestrian as the pedestrian makes initial contact with the initial impact section of the airbag.

The secondary impact section may include muscle wires which may be attached to the one or more arms of the secondary impact section. The muscle wires may be elastic and created from materials, such as nitinol, which deform when subjected to an electrical current. In this regard, the muscle wires may be constructed such that when the current is passed through the muscle wires, they extend into a shape which allows the secondary impact section of the external airbag to surround the pedestrian.

In some embodiments the secondary impact section may be fitted with one or more extenders, such as telescoping tubes. The telescoping tubes may be expanded from a closed position to an open position upon an initial impact. The expanded telescoping tubes may extend beyond the pedestrian in the direction of the opposing arm such that the pedestrian may be enclosed within the airbag. Accordingly, when the pedestrian rebounds from the initial impact the tubes enwrap the pedestrian's limbs and body, allowing the external airbag and/or the telescoping tubes to absorb some of the secondary impact forces.

The features described above may allow for improved safety around a vehicle. In this regard, the vehicle may offer safety measures to individuals and objects outside of the vehicle. Accordingly, vehicles can operate in environments close to pedestrians and other external objects with a reduced chance of causing injury or damage to the pedestrians or objects in the case of an inadvertent collision.

In addition, as discussed in detail below, the features described herein allow for various alternatives.

Example Systems

Figure 1:
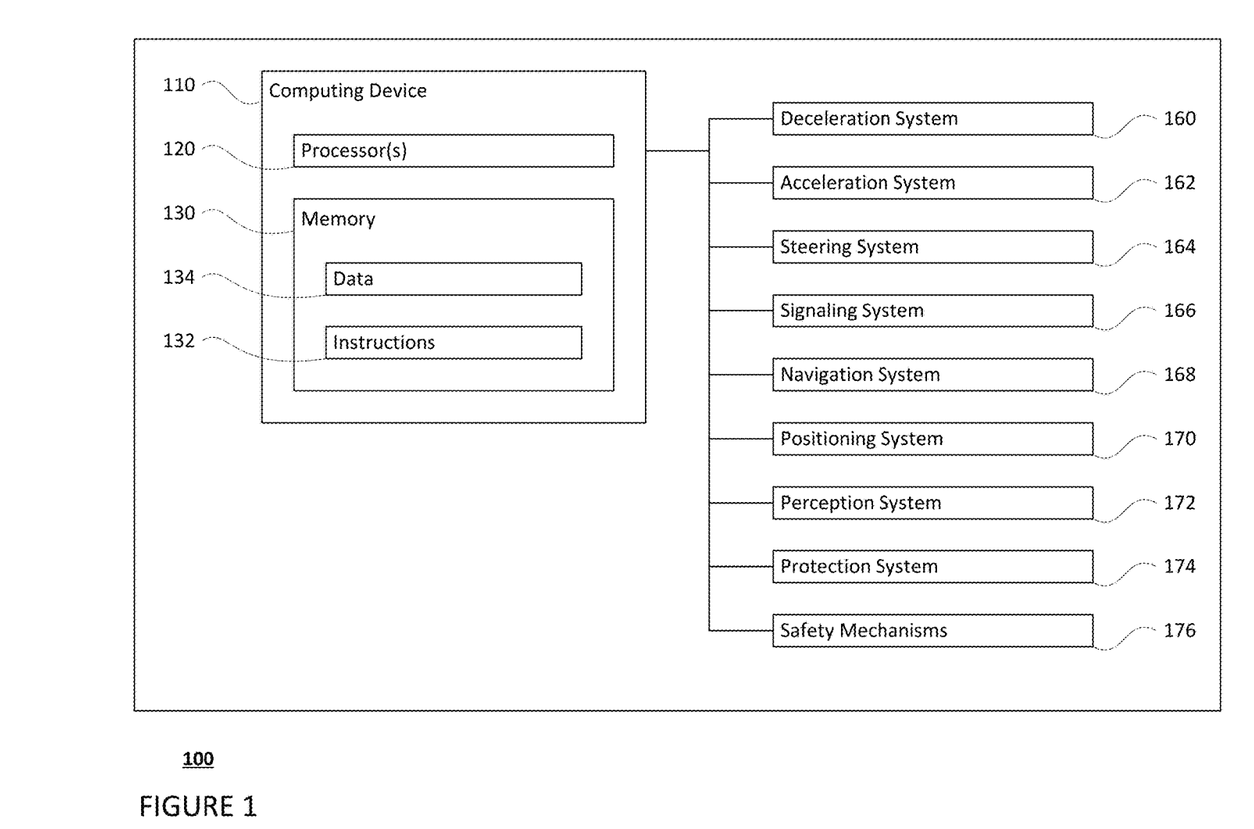
FIG. 1 is a functional diagram of an example vehicle in accordance with aspects of the disclosure.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 154 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, and perception system 172, and protection system 174 in order to control the movement, speed, etc. of vehicle 100 in accordance with the instructions 134 of memory 130. Again, although these systems are shown as external to computing device 110, in actuality, these systems may also be incorporated into computing device 110, again as an autonomous driving computing system for controlling vehicle 100. As with the computing device 110, each of these systems may also include one or more processors as well as memory storing data and instructions as with processors 120, memory 130, data 132 and instructions 134.

As an example, computing device 110 may interact with deceleration system 160 and acceleration system 162 in order to control the speed of the vehicle. Similarly, steering system 164 may be used by computer 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the roadway, traffic signals, signs, trees, etc. For example, the perception system 170 may include lasers, sonar, radar, cameras and/or any other detection devices that record data which may be processed by computing device 110. In the case where the vehicle is a small passenger vehicle such as a car, the car may include a laser sensor 214 (shown in FIGS. 2A and 2B) or other sensors mounted on the roof or other convenient location.

The computing device 110 may control the direction and speed of the vehicle by controlling various components. By way of example, computing device 110 may navigate the vehicle to a destination location completely autonomously using data from the detailed map information and navigation system 168. Computing device 110 may use the positioning system 170 to determine the vehicle's location and perception system 172 to detect and respond to objects when needed to reach the location safely. In order to do so, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 162 may be a part of a drivetrain that includes various components between an engine of the vehicle and the wheels of the vehicle. Again, by controlling these systems, computing device 110 may also control the drivetrain of the vehicle in order to maneuver the vehicle autonomously.

The sensors of perception system 172 may detect objects in the vehicle's environment as well as characteristics of those objects such as their location, heading, size (length height and width), type, and approximate center of gravity. For example, the perception system may use the height of an object identified as a pedestrian (or human) to estimate the approximate center of gravity of the object. In this regard, the perception system may compare the characteristics of the object to known anthropomorphic data to determine an approximate center of gravity. For other object types, the approximate center of gravity may be determined from the characteristics of the object using various known statistical analyses. Data and information required for these determinations may be stored, for example, in memory 130 or a different memory of the perception system.

As discussed in more detail below, information from the perception system may be sent to various other systems in order to make decisions about when and how to deploy various safety mechanisms. In this regard, the perception system may send the information to the vehicle's computing devices which make such decisions and forward activation instructions to protection system 174 which deploys one or more safety mechanisms 176 in accordance with the activation instructions. In another example, the perception system 172 may forward the information directly to the protection system 174 which makes then determines whether and how to deploy one or more safety mechanisms 176.

Thus, the vehicle may also include a plurality of safety mechanisms 176. These safety mechanisms may be configured to reduce the likelihood of damage to objects outside of the vehicle as opposed to those meant to specifically protect passengers inside the vehicle. At least some of these safety mechanisms may be active, in that the device must be activated or deployed by a signal generated by one or more computing devices when an impact is imminent.

Figure 2A:
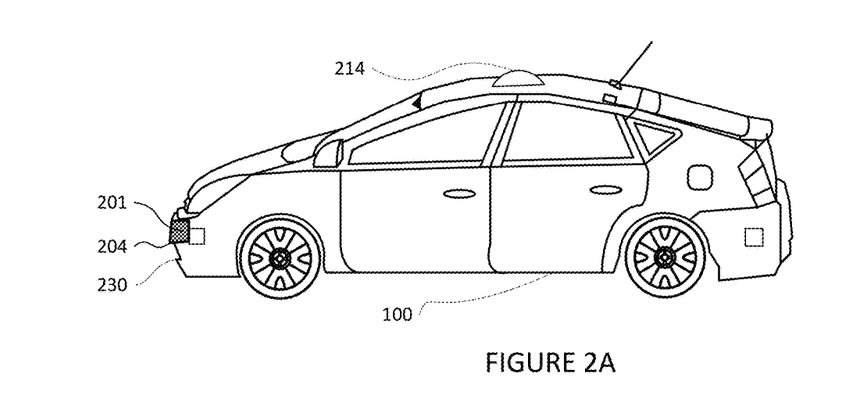
FIGS. 2A and 2B are example external views of a vehicle in accordance with aspects of the disclosure.

The one or more safety mechanisms 176 may include one or more airbag systems. The one or more airbag systems may include external airbags may be mounted to a vehicle internally or externally. For example, an airbag system 201 may be mounted in the interior of the front bumper 230 of the vehicle 100, as shown in FIG. 2A.

The airbag system 201 may be stored in a compartment within the vehicle. For example, as further shown in FIG. 2A, the airbag system 201 may be stored in compartment 204. In some embodiments, the compartment 204 may be mounted anywhere on or within the vehicle. For instance, compartments housing one or more external airbags may be mounted within the front bumper 230, rear bumper or trunk of the vehicle, within the vehicles doors, or attached to the exterior of the vehicle.

Figure 2B:
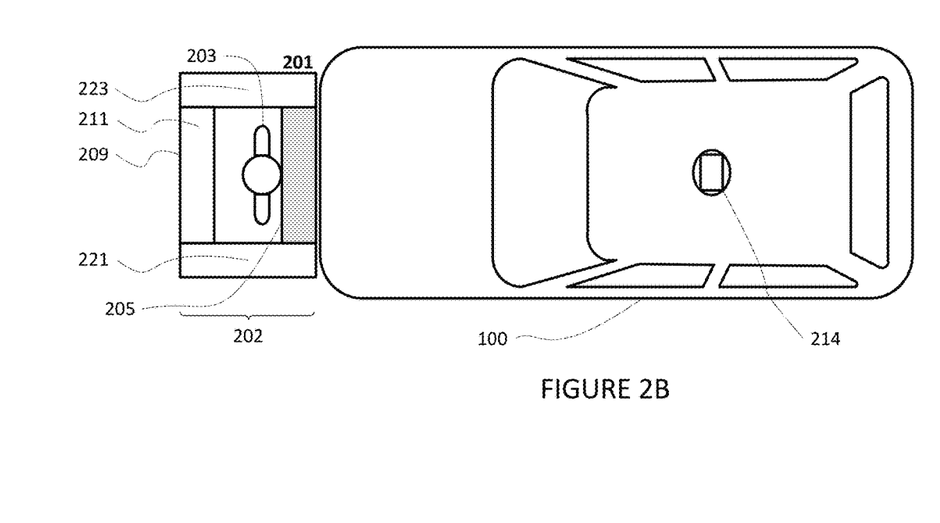

The external airbags of the airbag system may be designed to deploy and expand upon the vehicle detecting an imminent impact. For instance, the vehicle's computing device, such as computing device 110, may determine that an impact with an object, such as a pedestrian is imminent, and in response, the vehicle's computing devices may send a signal to deploy the external airbag 202. Upon receiving the signal to deploy, the external airbag 202 may be inflated or filled to an expanded state, as shown in FIG. 2B.

The external airbag 202 may be comprised of nylon, polyester, and/or other such materials typically used to make airbags.

In some instances the external airbag may be comprised of multiple sections. For instance, as further shown in FIG. 2B, the external airbag 202 may include an initial impact section 205 and a secondary impact section 209. Additionally, the secondary impact section 209 may include one or more arms 221 and 223, or other such enclosing structures such as tubes, additional airbags, or nets. In some embodiments the enclosing structures, such as the one or more arms 221 and 223, may include one or more extenders 211.

As with a typical airbag, the initial impact section of the external airbag may be configured to absorb the initial impact forces. In this regard, the initial impact section 205 may be configured to cover or block a portion of the vehicle 100 with which the pedestrian 203 is projected to impact.

For example, as further shown in FIG. 2B, when an impact between the vehicle 100 and the pedestrian 203 is projected to occur, the initial impact section 205 may be configured such that it deploys in a vertical orientation extending from around ground level, upward, such that it blocks the pedestrian 203 from making contact with the portion of the vehicle 100 with which the pedestrian is projected to impact. Thus, the initial impact section 205 may be configured such that it acts like a barrier blocking the pedestrian 203 from hitting the windshield and/or hood of the vehicle, as shown in FIG. 2B. Alternatively, when an impact with the pedestrian 203 is projected to occur at a particular portion of the vehicle 100, such as the rear of the vehicle, the initial impact section 205 may be configured to cover that portion of the vehicle (e.g., the rear windshield and/or rear bumper of the vehicle).

The secondary impact section may be configured to wrap around the object during or before the initial impact. For example, the secondary impact section 209 may surround the pedestrian as the pedestrian makes initial contact with the initial impact section 205 of the airbag, as further shown in FIG. 2B. In this regard, upon the pedestrian's initial impact with the airbag, the force of the impact may cause air within the airbag to shift via a pressure differential, or a similar mechanism, from the initial impact section 205 to the secondary impact section 209. This shift may then cause the one or more arms 221 and 223 to stiffen. As such, the one or more arms 221 and 223 may encase the pedestrian 203 during primary impact and absorb some of the secondary impact forces felt by the pedestrian 203 as the pedestrian rebounds from the initial impact section 205.

In some embodiments the secondary impact section may include one or more wires or a mesh of wires. For instance, as shown in the top perspective of the external airbag in FIG. 3A and the front perspective of the external airbag of FIG. 3B, one or more wires 301 and 302 may be attached to the arms 221 and 223 of the secondary impact section. In some embodiments the wires 301 and 302 may be muscle wires woven into the airbag. Alternatively, or in addition to weaving the wires 301 and 302 into the external airbag 202, the wires 301 and 302 may be attached by to supports 340 in the arms 221 and 223 of the secondary impact section 209 by sewing or welding the wires in place, by using an adhesive such as glue, or by hook and loop fasteners (such as Velcro®). In some embodiments, the wires may extend into the initial impact section.

Figure 3A:
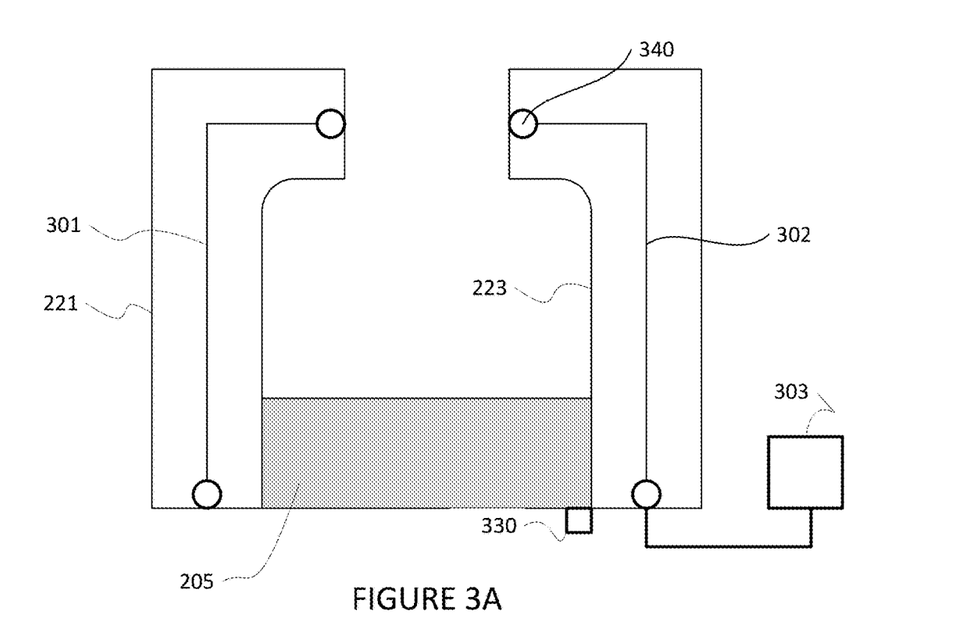
FIGS. 3A and 3B are example views of an external airbag with muscle wires in accordance with aspects of the disclosure.
Figure 3B:
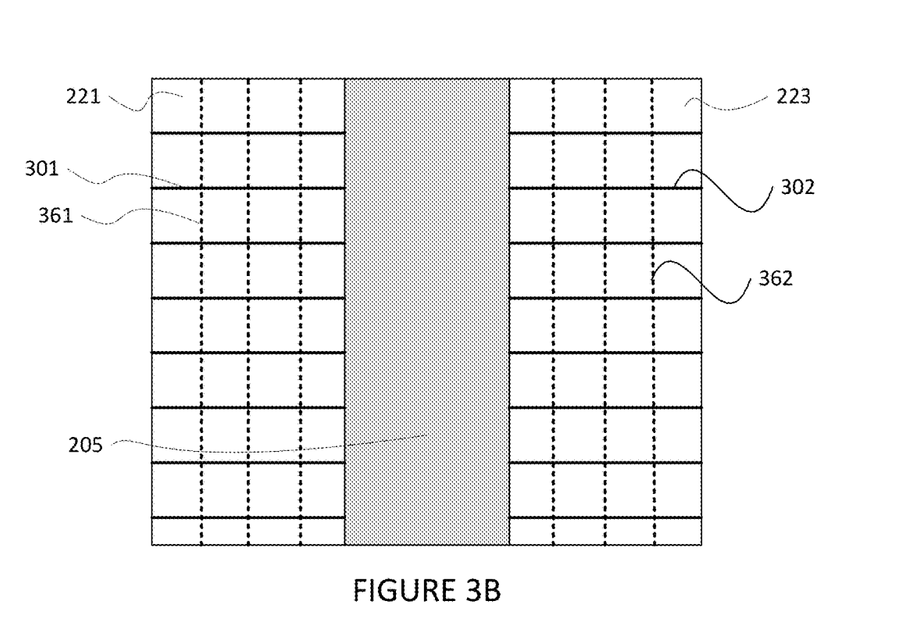

The wires may be elastic and created from materials, such as nitinol, which deform when subjected to an electrical current. In this regard, the wires 301 and 302 may be muscle wires attached to a power supply 303, as further shown in FIG. 3A. The current through the muscle wires may be initiated upon one or more sensors sending a triggering signal. For example, the one or more sensors, such as sensor 330, may detect of a change in internal pressure of the external airbag upon the pedestrian contacting the initial impact section 205. In response, the sensor may send a triggering signal to the power supply 303 via a wired or wireless connection. In response to the triggering signal, the power supply 303 may provide current to the wires 301 and 302. Each arm may include a number of wires. For instance, as shown in FIG. 3B, each arm 221 and 223 may include eight wires.

Alternatively, or in addition to the change in pressure sensing, the one or more sensors may use location signals, such as radar, lidar, sonar, etc., to detect that an object has contacted the initial impact section 205 of the external airbag 202. Based on the detection of an object making an initial impact with the initial impact section 205, a triggering signal may be sent to the power supply 303 causing the power supply to provide current to the wires 301.

In some embodiments, the wires may be muscle wires that go back to their original state when heat is applied to them. As such, the muscle wires may be reused in another external airbag.

In some embodiments a mesh of wires may be used to create netting within the external airbag. For instance, as further shown in FIG. 3B, each arm may include a number of vertical wires, such as wires 361 and 362, in addition to the horizontal wires 301 and 302 relative to the ground the vehicle is driving on.

The wires, including the vertical wires, may be elastic and created from materials, such as nitinol, which may spring open from a closed position. For instance, as further shown in FIG. 3B, each arm 221 and 223 may include a grid of wires, including the vertical and horizontal wires. In this regard, the horizontal and vertical wires may create netting, such as a mesh netting. The netting may be in an extended shape, as shown in FIG. 3B, at the time of manufacture. The netting and external airbag may be folded into a compressed state and placed into a compartment, such as compartment 204.

Figure 4:
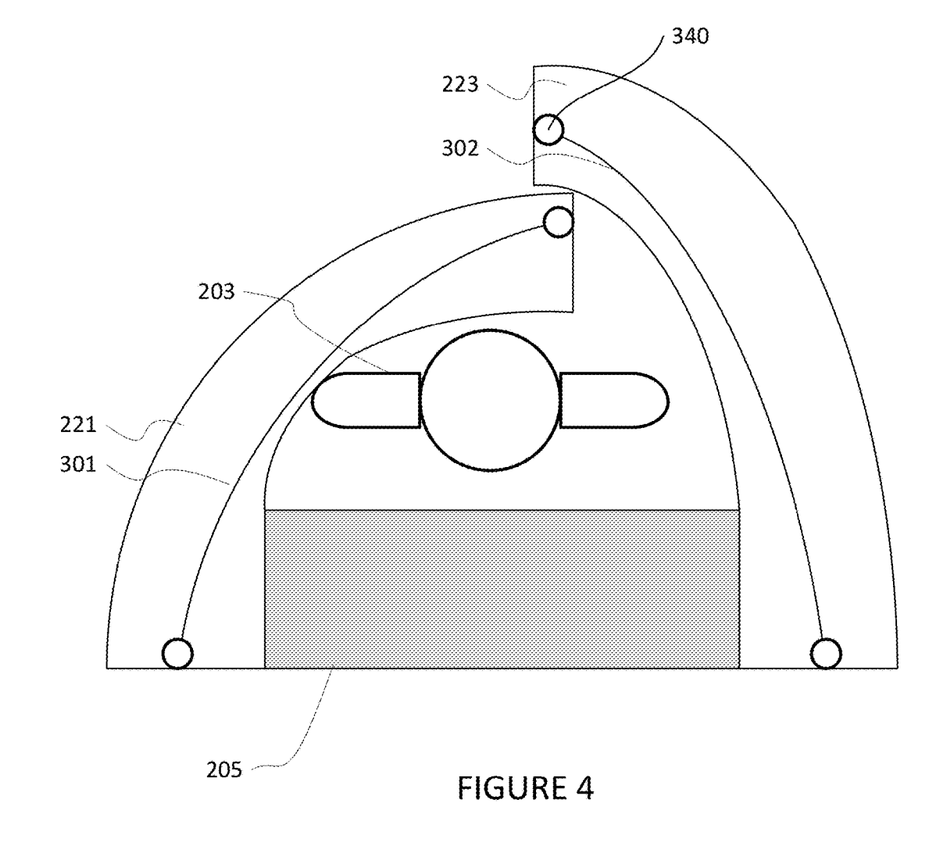
FIG. 4 is an illustration of a pedestrian being surrounded by an external airbag in accordance with aspects of the disclosure.

The muscle wires and/or netting may be constructed such that when the external airbag is deployed the external airbag surrounds the pedestrian. For instance, in an external airbag containing muscle wires, current may passed through the muscle wires. In response to the current the muscle wires may extend into a shape which allows the secondary impact section of the external airbag to surround the pedestrian. For instance, as shown in FIG. 4, when current is based through the muscle wires, the muscle wires may stiffen and expand, thereby guiding the arms 221 and 223 of the secondary impact area 209 around the pedestrian 203. As such, the pedestrian 203 may be contained within the external airbag prior to the initial impact with the initial impact section 205 completing. Accordingly, when the pedestrian rebounds from the initial impact section 205, the arms 221 and 223 of the secondary impact area may be in position to absorb some of the secondary impact forces, as further shown in FIG. 4.

In some embodiments one or more actuators may cause the one or more arms to enclose around the pedestrian. For instance, in the external airbag, a first end of wires 301 and 302 may be attached to the supports 340 in the arms 221 and 223, respectively, as shown in FIG. 4. The second end of the wires may be attached to one or more actuators. The actuators may push and/or pull the wires causing the arms to move. In this regard, as the one or more actuators pull wires 301 and 302, the arms 221 and 223 may wrap around the pedestrian 203. In certain embodiments the wires may be Bowden cables.

In another embodiment, when an external airbag containing netting is deployed, the netting may cause the external airbag to surround the pedestrian. In this regard, the compressed state of the folded netting may store spring energy. Upon being deployed, the compartment may no longer contain the spring energy of the netting. As such, the netting may rapidly expand into its extended shape upon the external airbag being deployed.

Figure 5:
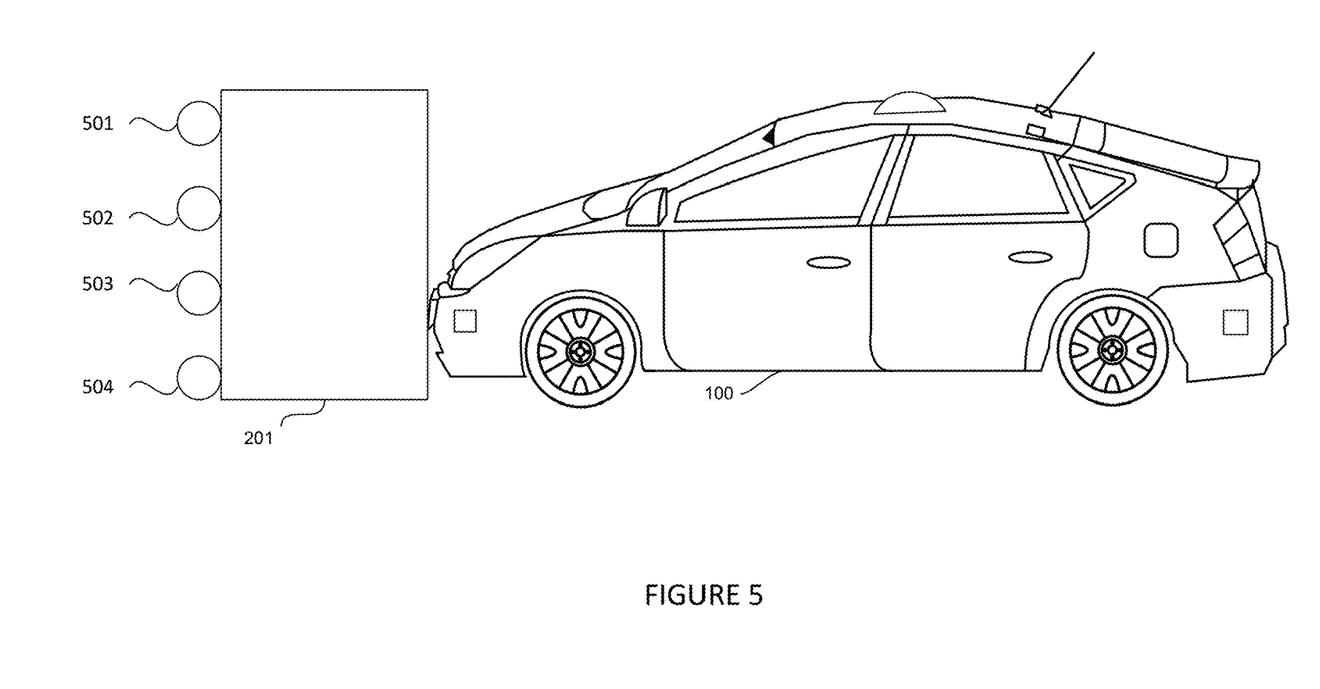
FIG. 5 is an example external view of a vehicle with an external airbag with extenders in accordance with aspects of the disclosure.

In some embodiments the secondary impact section may be fitted with one or more extenders. For instance, the one or more extenders may include telescoping tubes 501, as shown in FIG. 5. The telescoping tubes 501-04 may be positioned on the surface of the external airbag 202, such as on the forward-facing portion of the one or more arms of the secondary impact area 209, as further shown in FIG. 5. The telescoping tubes 501 may be created from a soft material, such as nylon or polyester.

Figure 6A:
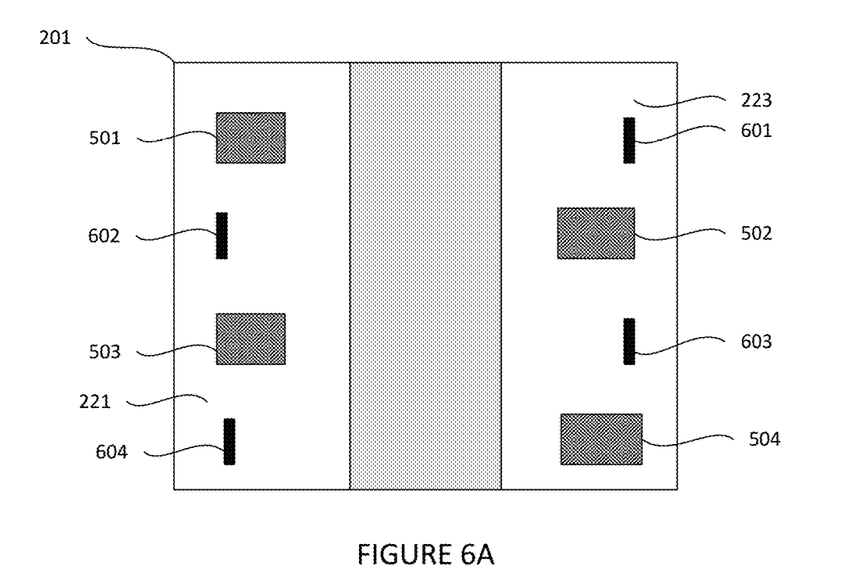
FIGS. 6A and 6B are example views of an external airbag with telescoping tubes and connectors in accordance with aspects of the disclosure.
Figure 6B:
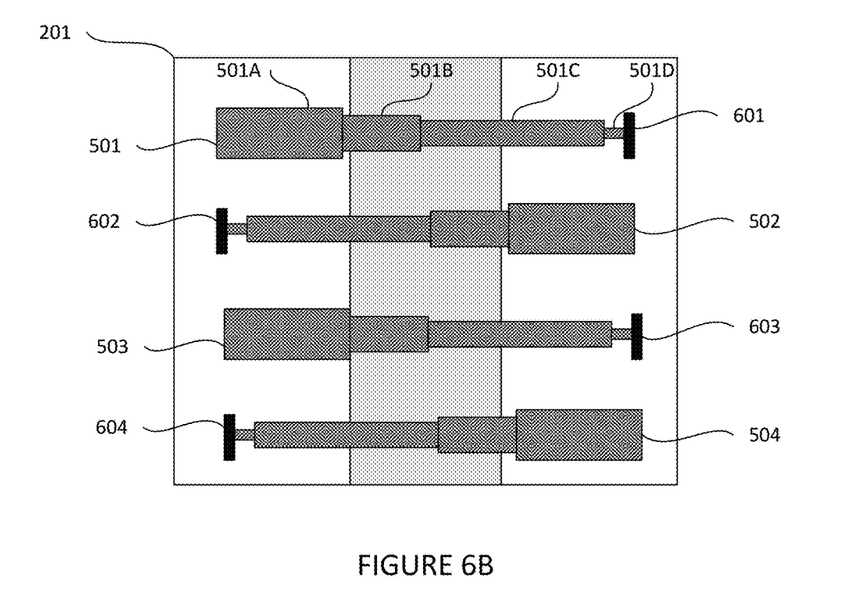

Each telescoping tube may be comprised of one or more stages. In this regard, one or more stages may be stored within an outer stage 501A, as shown in FIG. 6B. The outer stage 501A may extend first, followed by each other stage stored within the outer stage. As shown in FIG. 6B stage 501A may expand first, followed by stages 501B, 501C and 501D, respectively.

In certain embodiments the one or more extenders may be positioned on a single arm or multiple of the one or more arms. For example, as shown in FIG. 6A, arms 221 and 223 may each include multiple telescoping tubes. In this regard, arm 221 may include telescoping tubes 501 and 503, while arm 223 may include telescoping tubes 502 and 504.

The telescoping tubes may be expanded from a closed position to an open position upon an initial impact. In this regard, prior to the pedestrian impacting the external airbag the telescoping tubes 501-504 may remain in a closed position, as shown in FIG. 6A. Upon the pedestrian impacting the initial impact section, the gas in the initial impact section 205 of the external airbag 202 may be compressed and pushed into metered openings of the telescoping tubes 501-504 in the grid of telescoping tubes. As such, the telescoping tubes may expand, as shown in FIG. 6B. Alternatively or in addition, each telescoping tube may be expanded through individual or shared expansion devices, such as explosives, pumps, or pneumatics.

The expanded telescoping tubes may extend beyond the pedestrian in the direction of the opposing arm. In this regard, the furthest end of the telescoping tubes 501-504 may be secured or in contact with the opposing end. For instance, the furthest end of each telescoping tube 501-504 may be secured to the opposing arm with locks 601-604, respectively. The locks may be clips or adhesives, such as glue, hook and loop fasteners, arrowheads with foldable wings, magnets, piercing locks, etc.

Figure 7:
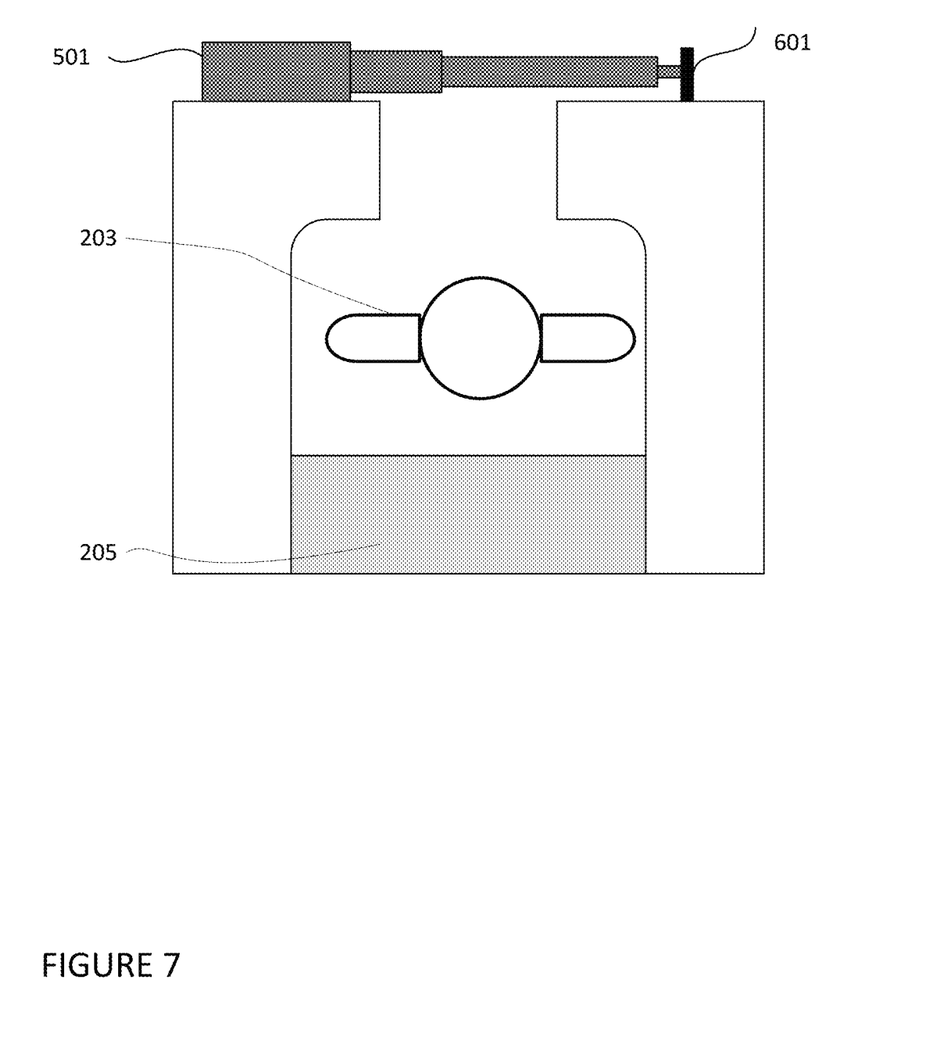
FIG. 7 is an illustration of a pedestrian being surrounded by an external airbag in accordance with aspects of the disclosure.

Upon the telescoping tubes extending beyond the pedestrian, the pedestrian may be enclosed within the external airbag. For instance, as shown in FIG. 7, the telescoping tube 501 may extend around pedestrian 203 upon the pedestrian making contact with the initial impact section 205 of the external airbag 202. Accordingly, when the pedestrian rebounds from the initial impact the tubes enwrap the pedestrian's limbs and body, allowing the external airbag 202 and/or the telescoping tubes 501-504 (only telescoping tube 501 being depicted in FIG. 7 for clarity), to absorb some of the secondary impact forces.

Figure 8A:
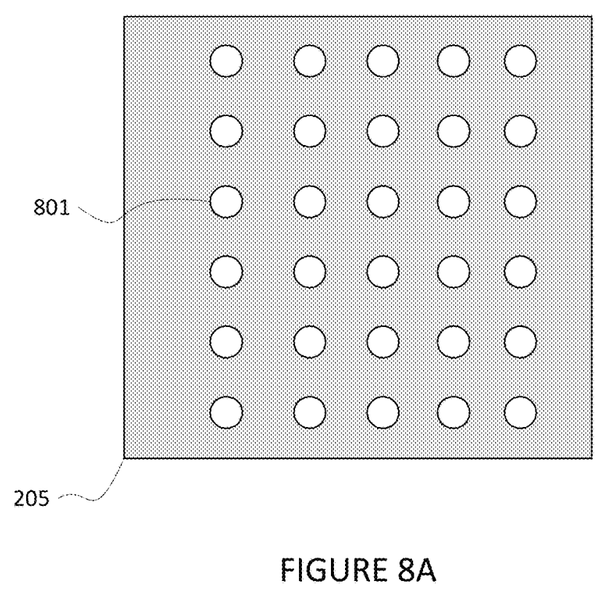
FIGS. 8A and 8B are example views of an external airbag with restraint tubes in accordance with aspects of the disclosure.
Figure 8B:
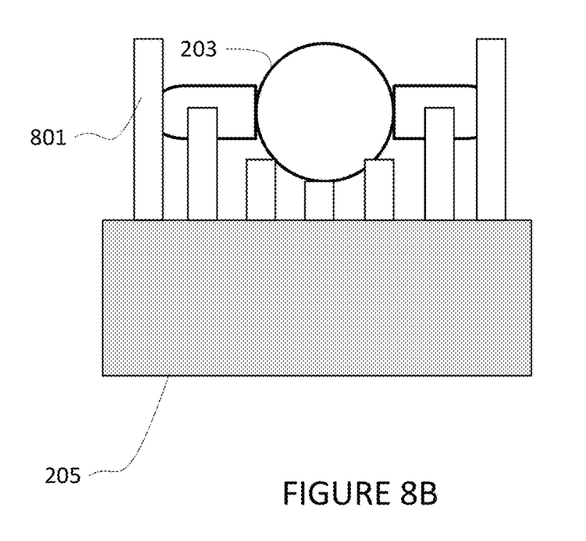

In some embodiments the initial impact section may include one or more extending tubes. For instance, as shown in FIG. 8A, extending tubes 801 may be positioned on the front side of the initial impact section 205 of the external airbag. The extending tubes 801 may be configured to wrap around the object during the initial impact. For example, the extending tubes 801 may surround the pedestrian as the pedestrian 203 makes initial contact with the initial impact section 205 of the airbag, as further shown in FIG. 8B. In this regard, upon the pedestrian's initial impact with the airbag, the force of the impact may cause air within the airbag to shift via a pressure differential, or a similar mechanism, from the initial impact section 205 to the extending tubes 801. This shift may then cause the one or more extending tubes 801 to stiffen. As such, the one or more extending tubes 801 may encase the pedestrian 203 during primary impact and absorb some of the secondary impact forces felt by the pedestrian 203 as the pedestrian rebounds from the initial impact section 205.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 9:
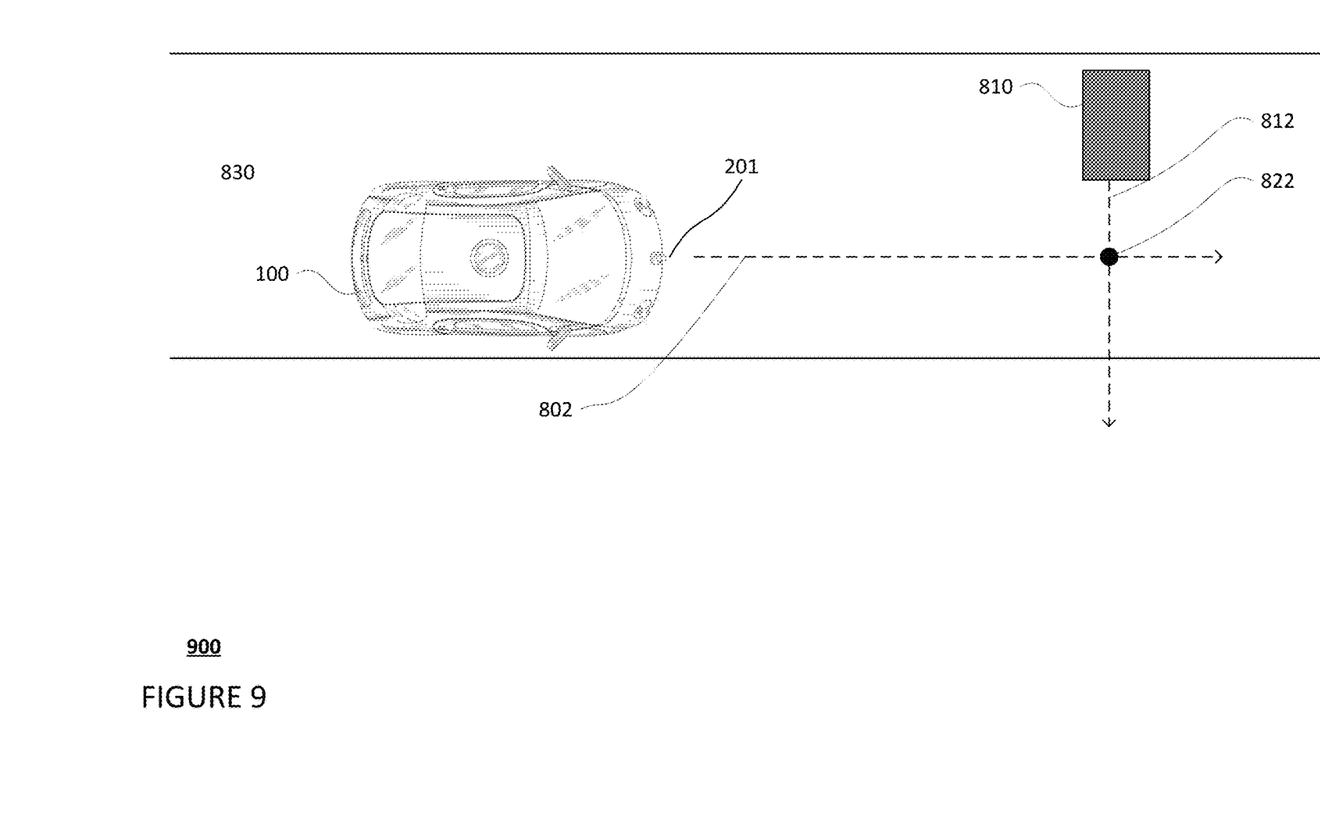
FIG. 9 is an example situational diagram in accordance with aspects of the disclosure.

Prior to deploying the safety mechanisms, vehicle's computing devices may use information from the vehicle's sensors to identify and track objects in the vehicle's environment. For example, one or more computing devices of the perception system may use information form the vehicle's sensors to detect and identify the characteristics (size, speed, shape, direction, object type, etc.) of various objects in the vehicle's environment. FIG. 9 is an example 800 bird's eye view of vehicle 100 as it drives along roadway 830 in the direction of arrow 802. In this example, the one or more computing devices of the perception system 174 may identify, among other things, the location and objects in the vehicle's environment, such as object 810. After a brief period of tracking the object, the perception system 174 may determine the speeds and headings of the object as shown by arrows 812.

In addition, the vehicle's computing devices may use the characteristics of the object 810, such as speed and heading, to predict future locations where the object 810 will be. For example, as shown in example 800 of FIG. 9, direction arrow 802 represents predicted future locations of vehicle 100 and arrow 812 represents the predicted future locations of object 810. Because the predicted future locations of these objects is just that, a prediction, predictions may quickly become less accurate the farther into the future they become.

The vehicle's computing devices may also determine whether the future locations indicate that the vehicle will collide with the object. For example, the perception system or computing device 110 may determine that an impact with object 810 is likely to occur at the locations of predicted impact point 822. This impact point may be defined as a three-dimensional coordinate (x, Y, Z) in space such as latitude, longitude, and altitude or similar.

In most cases, if a collision is likely, the vehicle's computing devices may maneuver the vehicle in order to avoid the object. For example, computing device 110 may use the steering, acceleration and deceleration systems to maneuver vehicle 100 out of the path of object 810.

However if there is not enough time to avoid the object, (i.e. not enough distance, not enough braking power, not enough room to go around or avoid etc.) the vehicle's computing devices may determine that an impact with the object is imminent. For example, an impact may be imminent, when an impact is predicted to occur within a predetermined period of time, such as a few seconds or more or less. When an impact is imminent, the vehicle's computing devices may send a signal to deploy the external airbag This triggering signal may be sent for example by computing device 110, laser sensor 214, or the one or more computing devices of protection system 176. This signal may cause an external airbag on the vehicle to deploy. For example, as shown in FIG. 8, the front of the vehicle 100 may be predicted to impact object 810 at point 822. As such, the computing device 110 may send a triggering signal to deploy airbag 202 prior to the impact.

Figure 10:
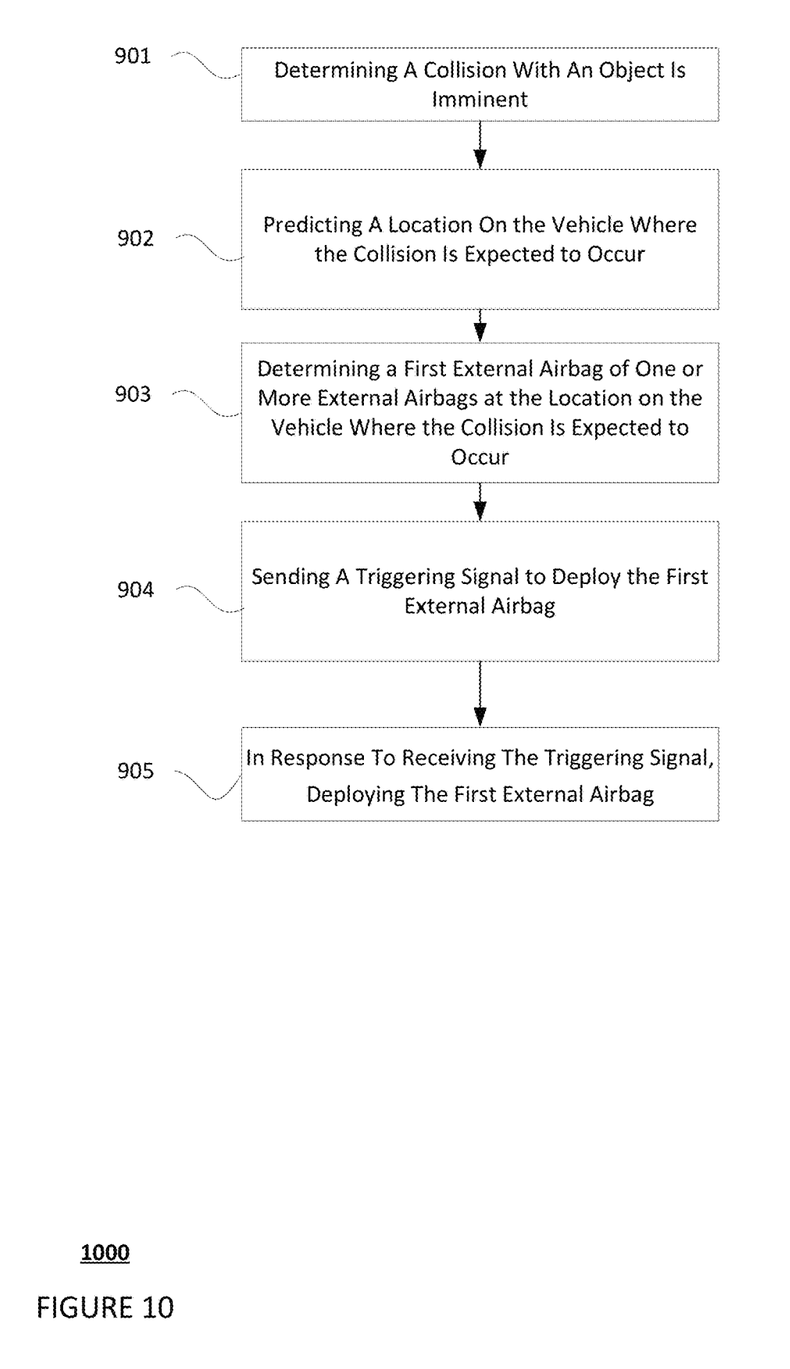
FIG. 10 is an example flow diagram in accordance with aspects of the disclosure.

FIG. 10 is an example flow diagram 900 including a method for reducing likelihood of injury or damage to an object in a collision with a vehicle, in accordance with some of the aspects described above. For example, at block 901, a determination that a collision with an object is imminent. At block 902 the location on the vehicle where the collision with the object is expected to occur may be detected and a determination of a first external airbag of one or more external airbags at the location on the vehicle where the collision is expected to occur may be made, as shown in block 903. A triggering signal may be sent to deploy the first external airbag as shown at block 904 and in response to receiving the triggering signal, the first external airbag may be deployed, as shown in block 905. In some embodiments more than one external airbag may be deployed.

Although the examples described herein are related to the use of vehicles when operating in autonomous driving modes, such features may also be useful for vehicles operating in manual or semi-autonomous modes or for vehicles having only manual driving mode and semi-autonomous driving modes. In such cases, an active safety mechanism may be identified as discussed above. However, when making the determination as to whether to deploy the active safety mechanism and/or control the vehicle as discussed above, the reaction time of the driver may be compared with the estimated time at which an impact with an object is expected to occur. Reaction times may be determined, for example, by monitoring a specific driver's reaction times over time or by using average or expected reaction times for drivers in general. If the reaction time is too slow, the vehicle's computing device may then use the estimated time when an update will be received to determine whether to deploy the active safety mechanism and, in the case of a vehicle with such capabilities to take control and maneuver the vehicle as discussed in the examples above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   an initial impact airbag; and
   a secondary impact airbag comprising one or more enclosing structures configured to surround an object, wherein the secondary impact airbag is configured to reduce injury caused by a secondary impact of an object upon after an initial impact of the object with the initial impact airbag, and
   one or more muscle wires embedded in the secondary impact airbag, wherein the one or more muscle wires are configured to receive a current and, in response to the current, guide the one or more enclosing structures around the object.

2. The system of claim 1, wherein the initial impact airbag is configured to be deployed at a location where the object is predicted to collide.

3. The system of claim 1, wherein the secondary impact airbag comprises one or more arms configured to surround the object upon the initial impact.

4. The system of claim 3, wherein the one or more muscle wires are embedded within the one or more arms and the one or more muscle wires are configured to guide the one or more arms around the object up-on the initial impact.

5. The system of claim 4, further comprising a power supply, wherein the power supply is configured to provide the current to the one or more muscle wires upon the occurrence of the initial impact.

6. The system of claim 3, wherein one or more extenders are connected to the one or more arms and the one or more extenders are connected to a first arm of the one or more arms and the one or more extenders are configured, upon the occurrence of the initial impact, to extend to a second arm of the one or more arms.

7. The system of claim 6, wherein the one or more extenders are telescoping tubes and wherein the telescoping tubes are each comprised of at least two stages.

8. The system of claim 1, further comprising one or more sensors configured to determine when an initial impact occurs; and
   wherein the one or more sensors are configured to send a triggering signal to deploy the secondary impact airbag based upon the determination of when the initial impact occurs.

9. The system of claim 1 further comprising:
   an airbag system comprising at least the initial impact airbag and secondary impact airbag; and
   a vehicle, wherein the airbag system is attached to the vehicle.

10. A method for deploying a vehicle's external airbag comprising:
    determining, by one or more processors, a collision with an object is imminent;
    predicting, by the one or more processors, the location on the vehicle where the collision with the object is expected to occur;
    determining a first external airbag of one or more external airbags at the location on the vehicle where the collision is expected to occur;
    sending, by the one or more processors, a triggering signal to deploy the first external airbag; and
    in response to receiving the triggering signal, deploying by the one or more processors, the first external airbag, wherein the first external airbag comprises an initial impact airbag and a secondary impact airbag and the secondary impact airbag is configured to reduce injury caused by a secondary impact of an object after an initial impact of the object with the initial impact airbag by surrounding the object, and
    wherein deploying the first external airbag further includes providing a current to one or more muscle wires embedded in the secondary impact airbag, the one or more muscle wires being configured to guide the one or more enclosing structures around the object in response to the current.

11. The method of claim 10, further comprising wherein the initial impact airbag is configured to be deployed at a location where the object is predicted to collide with the vehicle.

12. The method of claim 10, wherein the secondary impact airbag comprises one or more arms configured to surround the object upon the initial impact.

13. The method of claim 12, wherein the one or more muscle wires are embedded within the one or more arms and the one or more muscle wires are configured to guide the one or more arms around the object up on the initial impact.

14. The method of claim 13, wherein the triggering signal further causes a power supply to provide the current to the one or more muscle wires upon the occurrence of the initial impact.

15. The method of claim 12, wherein one or more extenders are connected to the one or more arms and the one or more extenders are connected to a first arm of the one or more arms and the one or more extenders are configured, upon the occurrence of the initial impact, to extend to a second arm of the one or more arms.

16. The method of claim 15, wherein the one or more extenders are telescoping tubes and wherein the telescoping tubes are each comprised of at least two stages.

17. The method of claim 10, wherein one or more sensors are configured to determine when an initial impact occurs; and
    the one or more sensors send a triggering signal to deploy the secondary impact airbag based upon the determination of when the initial impact occurs.

18. A non-transitory computer readable medium on which instructions are stored, the instructions, when executed by one or more processors, cause the one or more processors to perform a method of deploying an external airbag, the method comprising:
    determining a collision with an object is imminent;
    predicting the location on the vehicle where the collision with the object is expected to occur;
    determining a first external airbag of one or more external airbags at the location on the vehicle where the collision is expected to occur;
    sending a triggering signal to deploy the first external airbag; and
    in response to receiving the triggering signal, deploying the first external airbag, wherein the first external airbag comprises an initial impact airbag and a secondary impact airbag comprising one or more enclosing structures configured to surround an object and the secondary impact airbag is configured to reduce injury caused by a secondary impact of an object after an initial impact of the object with the initial impact airbag, and
    wherein one or more muscle wires are embedded in the secondary impact airbag and the one or more muscle wires are configured to receive a current, and in response to the current, the one or more muscle wires guide the one or more enclosing structures around the object.

19. The non-transitory computer readable medium of claim 18, wherein the method further comprises deploying the initial impact airbag at a location where the object is predicted to collide with the vehicle.

20. The non-transitory computer readable medium of claim 18, wherein one or more muscle wires are embedded within the one or more arms and the one or more muscle wires are configured, upon the occurrence of the initial impact, to guide the one or more arms around the object up on the initial impact.

* * * * *